US010939412B2

(12) United States Patent
Phan et al.

(10) Patent No.: US 10,939,412 B2
(45) Date of Patent: *Mar. 2, 2021

(54) CAPABILITY EXTENSIONS FOR MULTIMEDIA BROADCAST MULTICAST SERVICES

(71) Applicant: Telefonaktiebolaget LM Ericsson (publ), Stockholm (SE)

(72) Inventors: Mai-Anh Phan, Herzogenrath (DE); Magnus Stattin, Upplands Väsby (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,299

(22) Filed: Oct. 18, 2019

(65) Prior Publication Data

US 2020/0053697 A1 Feb. 13, 2020

Related U.S. Application Data

(63) Continuation of application No. 16/028,882, filed on Jul. 6, 2018, now Pat. No. 10,455,548, which is a (Continued)

(51) Int. Cl.
*H04W 72/00* (2009.01)
*H04W 8/22* (2009.01)

(52) U.S. Cl.
CPC .......... *H04W 72/005* (2013.01); *H04W 8/22* (2013.01)

(58) Field of Classification Search
None
See application file for complete search history.

(56) References Cited

U.S. PATENT DOCUMENTS 8,570,928 B2  10/2013  Wu
8,675,583 B2  3/2014  Lee et al.
(Continued)

FOREIGN PATENT DOCUMENTS

CN  101959140 A  2/2011
CN  102118355 A  7/2011
(Continued)

OTHER PUBLICATIONS

Mediatek, "UE capability for service continuity", GPP TSG-RAN WG2 Meeting #74, May 9-13, 2011, pp. 1-4, Barcelona, Spain, R2-113086.
(Continued)

*Primary Examiner* — Robert C Scheibel
*Assistant Examiner* — Gautam Sharma
(74) *Attorney, Agent, or Firm* — Coats & Bennett, PLLC

(57) ABSTRACT

A base station of a mobile communication network supports continuity of a Multimedia Broadcast Multicast Service, MBMS, for a terminal. The base station receives, from the terminal, an information element informing the base station of a combination of bands, which the terminal supports for carrier aggregation. The terminal supports MBMS reception on any carrier configurable as a serving cell for the terminal according to the information element. The base station derives, from the received information element, MBMS reception capabilities of the terminal. The base station determines a number of carriers, which are configurable by the base station as serving cell of the terminal, such that the terminal is enabled to receive at least one MBMS.

30 Claims, 8 Drawing Sheets

Related U.S. Application Data continuation of application No. 15/226,335, filed on Aug. 2, 2016, now Pat. No. 10,070,413, which is a continuation of application No. 13/587,491, filed on Aug. 16, 2012, now Pat. No. 9,439,171.

(60) Provisional application No. 61/524,107, filed on Aug. 16, 2011.

(56) References Cited

U.S. PATENT DOCUMENTS

| | | |
|---|---|---|
| 9,439,171 B2 | 9/2016 | Phan et al. |
| 2004/0085926 A1 | 5/2004 | Hwang et al. |
| 2004/0146019 A1 | 7/2004 | Kim et al. |
| 2005/0090278 A1 | 4/2005 | Jeong et al. |
| 2005/0192021 A1 | 9/2005 | Lee et al. |
| 2005/0249140 A1 | 11/2005 | Lee et al. |
| 2006/0034225 A1 | 2/2006 | Jung et al. |
| 2006/0035644 A1 | 2/2006 | Niwano et al. |
| 2006/0221888 A1 | 10/2006 | Sebire et al. |
| 2008/0112352 A1 | 5/2008 | Kuo |
| 2010/0157969 A1 | 6/2010 | Swamy et al. |
| 2011/0013550 A1 | 1/2011 | Wu |
| 2011/0013576 A1 | 1/2011 | Hsu |
| 2011/0053490 A1 | 3/2011 | Wu |
| 2011/0235565 A1 | 9/2011 | Wu |
| 2011/0305183 A1 | 12/2011 | Hsu et al. |
| 2012/0106404 A1 | 5/2012 | Damnjanovic |
| 2012/0213129 A1 | 8/2012 | Jang et al. |
| 2012/0257524 A1 | 10/2012 | Chen et al. |
| 2012/0275369 A1 | 11/2012 | Zhang et al. |
| 2012/0327821 A1 | 12/2012 | Lin et al. |
| 2013/0039229 A1 | 2/2013 | Park et al. |
| 2013/0039248 A1 | 2/2013 | Koskinen et al. |
| 2013/0051288 A1 | 2/2013 | Yamada et al. |
| 2013/0064162 A1 | 3/2013 | Phan et al. |
| 2013/0114472 A1 | 5/2013 | Tamaki et al. |
| 2013/0130616 A1 | 5/2013 | Lee et al. |
| 2014/0112236 A1 | 4/2014 | Jung et al. |

FOREIGN PATENT DOCUMENTS

| | | |
|---|---|---|
| KR | 1020100116126 A | 10/2010 |
| RU | 2409894 C2 | 1/2011 |
| WO | 2009102797 A1 | 8/2009 |

OTHER PUBLICATIONS

3rd Generation Partnership Project, "Technical Specification Group Radio Access Network; Evolved Universal Terrestrial Radio Access (E-UTRA); User Equipment (UE) radio access capabilities (Release 10)", 3GPP TS 36.306 V10.2.0, Jun. 2011, pp. 1-21.

3rd Generation Partnership Project, "LTE; Evolved Universal Terrestrial Radio Access (E-UTRA); User Equipment (UE) radio access capabilities (3GPP TS 36.306 V10.2.0 Release 10)" ETSI TS 136 306 V10.2.0, Jun. 2011, pp. 1-23.

3GPP TSG-RAN WG2 #75, Ericsson, MBMS UE capability extensions, Athens, Greece, Aug. 22-26, 2011, R2-114478.

3GPP TS 36.331 version 10.2.0 Release 10, Evolved Universal Terrestrial Radio Access (E-UTRA); Radio Resource Control (RRC); Protocol specification (Jul. 2011).

Huawei, WID: Service continuity and location information for MBMS for LTE; TSG-RAN Meeting 51, Kansas City, USA, Mar. 15-18, 2011, RP-110452.

ETSI, "LTE; Evolved Universal terrestrial Radio Access (E-UTRA); User Equipment (UE) Radio Access Capabilities (3GPP TS 36.306 version 10.1.0 Release 10)", ETSI 136 306 V10.1.0, Apr. 1, 2011, pp. 1-20, ETSI.

|   | Band a | Band b |
|---|--------|--------|
| 1 | C |   |
| 2 |   | C |
| 3 | A | A |

CAPABILITY EXTENSIONS FOR MULTIMEDIA BROADCAST MULTICAST SERVICES

RELATED APPLICATIONS

The present application is a continuation of U.S. patent application Ser. No. 16/028,882, which was filed on Jul. 6, 2018, which is a continuation of U.S. patent application Ser. No. 15/226,335, which was filed on Aug. 2, 2016, now U.S. Pat. No. 10,070,413 issued on Sep. 4, 2018, which is a continuation of U.S. patent application Ser. No. 13/587,491, which was filed on Aug. 16, 2012, now U.S. Pat. No. 9,439,171 issued on Sep. 6, 2016, and claims the benefit of U.S. Provisional Patent Application 61/524,107 filed on Aug. 16, 2011, the disclosures of each of which are incorporated herein by reference in their entirety.

TECHNICAL FIELD

The present invention relates to methods in a mobile communication network, in a base station of a mobile communication network and in a terminal. The invention further relates to corresponding devices for implementing the nodes. In particular, the invention relates to supporting MBMS service continuity.

BACKGROUND

The Multimedia Broadcast Multicast Service (MBMS) relies on a point-to-multipoint interface specification for existing and upcoming cellular networks. MBMS specifications are designed to provide efficient delivery of broadcast and multicast services, both within cells of one or more radio access networks as well as within the core network of a mobile communication network. For broadcast transmission across multiple cells, MBMS specifications generally define transmissions via single-frequency network configurations. Applications of MBMS include mobile TV, radio broadcasting, file delivery and emergency alerts.

The Multimedia Broadcast Multicast Service (MBMS) feature for Evolved Universal Mobile Telecommunications System Terrestrial Radio Access Network, E-UTRAN, was specified in 3GPP Rel-9 (Third Generation Partnership Project Release 9). The scope of the 3GPP Rel-9 basically focused on deployments of MBMS considering only one carrier. In areas where MBMS is provided, MBMS/Unicast-mixed cells are deployed. A MBMS/Unicast mixed cell is a cell that supports MBMS and unicast transmissions on the same carrier.

For currently ongoing 3GPP work on Rel-11 (Release 11) according to the Work Item Description capture in RP-110452 (TSG-RAN Meeting 51, Fukuoka, Japan, September 2011), entitled "Service continuity improvements and location information for MBMS for LTE", solutions shall be developed such that the network may provide MBMS service continuity to the UE in multi-frequency deployments. MBMS status reports (also referred to as MBMS interest indication) have been introduced by 3GPP to enable the network to perform appropriate decisions for configuring UEs in connected mode.

According to the above cited 3GPP Work Item Description RP-110452, Mobility procedures do not account for MBMS reception in Release-9 and Release-10. Release-10 makes provision for deployments involving more than one carrier and for the network could take into account a UE's capability to operate in a specific frequency band or bands and/or to operate on one or several carriers. Making the network aware of the services that the UE is receiving or is interested to receive via MBMS could facilitate proper action by the network e.g., handover to a target cell or reconfiguration of Scell(s), to facilitate service continuity of unicast services and desired MBMS services. A UE in Idle Mode should be able to select/reselect cells in order to receive the desired service.

It is an object to obviate at least some of the above disadvantages and provide an improved network, base station and terminal for telecommunications. A further object is to provide concepts which support an improved MBMS service continuity. A further object is to provide a scheme which provides improved flexibility in configuring one or more serving cell(s) while MBMS service continuity for the terminal/UE is supported.

SUMMARY

According to one embodiment, a method in a base station of a mobile communication network for supporting continuity of a Multimedia Broadcast Multicast Service, MBMS, for a terminal is provided. The method comprises: the base station receives, from the terminal, an information element informing the base station of a combination of bands, which the terminal supports for carrier aggregation, wherein the terminal supports MBMS reception on any carrier configurable as a serving cell for the terminal according to the information element; the base station derives, from the received information element, MBMS reception capabilities of the terminal; and the base station determines a number of carriers, which are configurable by the base station as serving cell of the terminal, such that the terminal is enabled to receive at least one MBMS.

According to one embodiment, a method in a terminal for supporting continuity of a Multimedia Broadcast Multicast Service, MBMS, for the terminal is provided. The terminal sends, to a base station, an information element informing the base station of a combination of bands, which the terminal supports for carrier aggregation; wherein the terminal supporting MBMS reception for any carrier configurable as a serving cell for the terminal according to the information element.

According to one embodiment, a base station for a mobile communication network and for supporting continuity of a Multimedia Broadcast Multicast Service, MBMS, for a terminal is provided. The base station comprises a receiver for receiving, from the terminal, an information element informing the base station of a combination of bands, which the terminal supports for carrier aggregation, wherein the terminal supports MBMS reception on any carrier configurable as a serving cell for the terminal according to the information element. The bases station further comprises a controller for deriving, from the received information element, MBMS reception capabilities of the terminal, and for determining a number of carriers, which are configurable by the base station as serving cell of the terminal, such that the terminal is enabled to receive at least one MBMS.

According to one embodiment, a terminal for a wireless communication network and for supporting continuity of a Multimedia Broadcast Multicast Service, MBMS, for the terminal is provided. The terminal comprises a transmitter for sending, to a base station, an information element informing the base station of a combination of bands, which the terminal supports for carrier aggregation, wherein the terminal supports MBMS reception for any carrier configurable as a serving cell for the terminal according to the information element.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
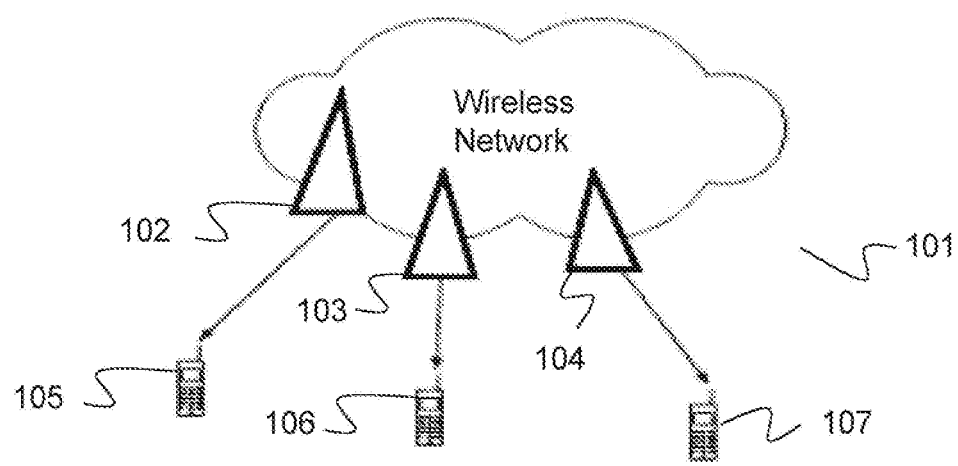
FIG. 1 schematically illustrates a wireless network environment in which concepts according to an embodiment may be applied.

FIG. 1 schematically illustrates a wireless network environment 101 in which concepts according to an embodiment may be applied. The wireless network environment 101 comprises infrastructure of a wireless network, represented by base stations 102, 103 and 104 and by terminals 105, 106, 107. In accordance with the addressed LTE scenario, the base stations may also be referred to as eNodeBs and the terminals may also be referred to as UEs. Note that although terminology from 3GPP LTE networks, such as that illustrated in FIG. 1, has been used in this disclosure to exemplify the invention, this should not be seen as limiting the scope of the invention to only the aforementioned system. Other wireless systems, including WCDMA, WMax, UMB and GSM, may also benefit from exploiting the ideas covered within this disclosure.

An example network, such as the one shown in FIG. 1, may generally include one or more instances of user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 2. Similarly, although the illustrated base stations may represent network nodes that include any suitable combination of hardware and/or software, these base stations may, in particular embodiments, represent devices such as the example base station illustrated in greater detail by FIG. 3.

Figure 2:
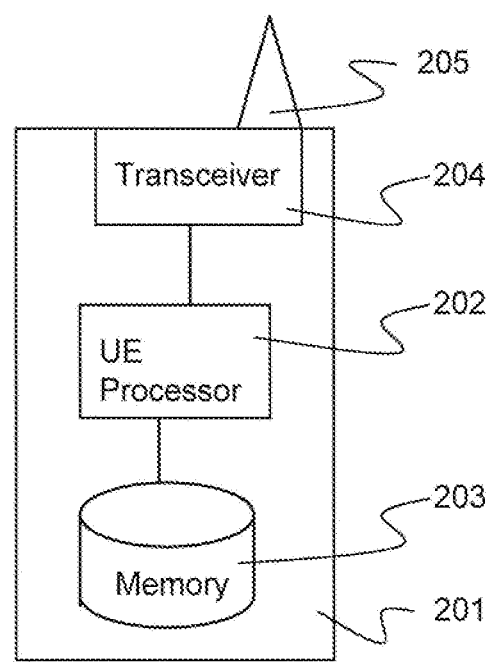
FIG. 2 schematically illustrates a terminal in which concepts according to an embodiment may be applied.

In FIG. 2, the example UE 201 includes a processor 202, a memory 203, a transceiver 204, and an antenna 205. In particular embodiments, some or all of the functionality described as being provided by mobile communication devices or other forms of UE may be provided by the UE processor 202 executing instructions stored on a computer-readable medium, such as the memory 203 shown in FIG. 2. Alternative embodiments of the UE may include additional components beyond those shown in FIG. 4 that may be responsible for providing certain aspects of the UE's functionality, including any of the functionality described and/or any functionality necessary to support the solution described.

Figure 3:
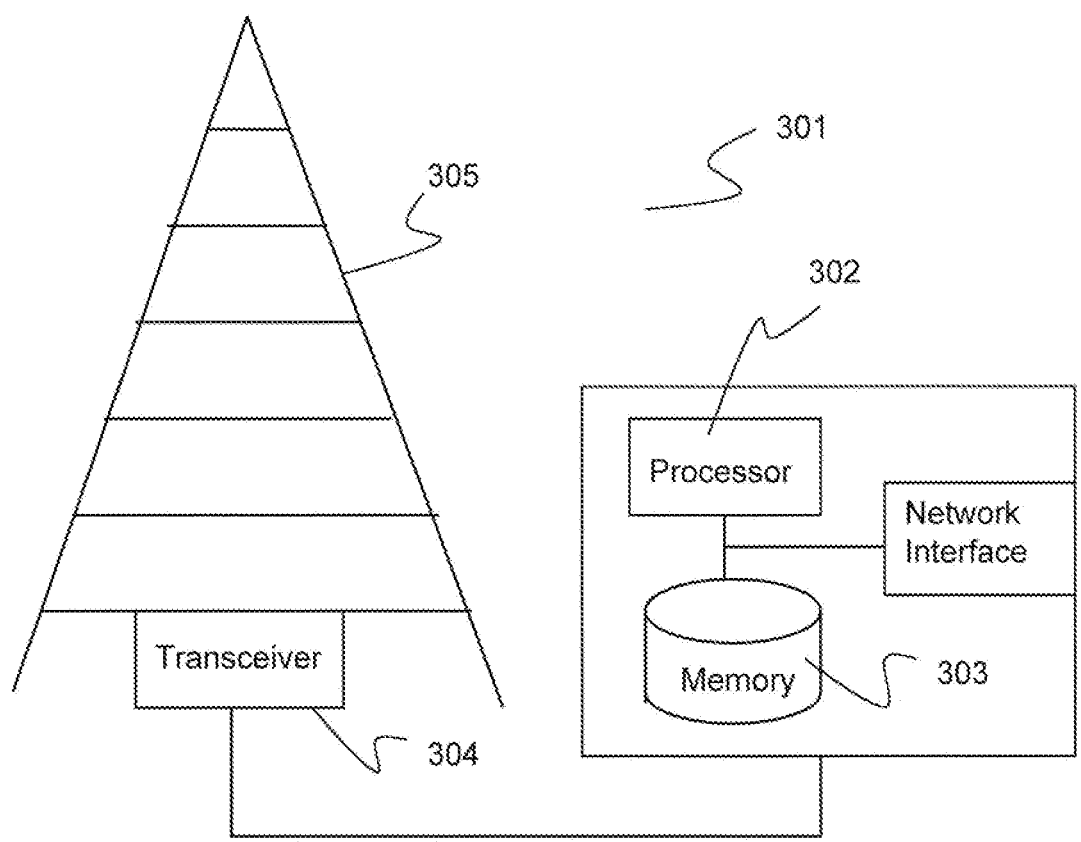
FIG. 3 schematically illustrates a base station in which concepts according to an embodiment may be applied.

In FIG. 3, the example base station 301 includes a processor 302, a memory 303, a transceiver 304, and an antenna 305. In particular embodiments, some or all of the functionality described as being provided by a mobile base station, a base station controller, a node B, an enhanced node B, and/or any other type of mobile communications node may be provided by the base station processor executing instructions stored on a computer-readable medium, such as the memory 303 shown in FIG. 3. Alternative embodiments of the base station 301 may include additional components responsible for providing additional functionality, including any of the functionality identified and/or any functionality necessary to support the solution described.

In general, with respect to LTE, an MBMS UE (User Equipment) does not provide feedback for link adaptation to the network, i.e., the network has to select the modulation and coding scheme, such that the signal can be decoded by a predefined probability (typically, the 95th percentile is used). Thus, the uplink is only used for unicast transmission. Furthermore, it does not provide any information to the network about its MBMS reception status nor about its MBMS reception capabilities. In this context, the MBMS reception status differentiates whether the UE is receiving one or more MBMS services or not receiving any MBMS services. Another status may comprise the UE's interest in receiving one or more MBMS services. If the UE is interested in or already receiving an MBMS service, the MBMS reception status may additionally comprise the status on which frequency or on which frequencies the UE is currently receiving the MBMS service. Feedback (from the UE to the network) can only be provided starting from 3GPP Rel-10 during network initiated counting procedures. For example, if the UE receives a counting request from the network for an MBMS service it is interested to receive, it will respond with a counting response message.

In principle, in 3GPP Rel-9/10, an MBMS capable UE in idle mode is only required to receive MBMS on a serving cell, i.e., a cell on which it is camping, and if the MBMS capable UE is in connected mode it is only required to receive MBMS in its serving cell.

Depending on UE implementation, MBMS UEs may also be capable of receiving MBMS services on so-called non-serving cells. When the UE in idle mode and camping on its serving cell, it can in principle receive the MBMS from a neighboring cell, which operates on a different frequency and broadcasts the MBMS. When the UE is in connected mode, it could analogously receive the MBMS on a non-serving cell. For example, when the UE is camping on one cell it can in principle receive the MBMS from a neighboring cell, which broadcasts the MBMS. Such capabilities are primarily determined by the UE's radio front-end and baseband design.

In this context the terms serving cell and non-serving cell are used to also address idle mode UEs, such that no differentiation needs to be done between idle and connected mode UEs. So for idle mode, non-serving cells are cells on which the UE is not camping and not monitoring paging, and for connected mode the network has not configured these non-serving cells for unicast communication with the UE. Furthermore, a non-serving cell could be provided by the same eNB that provides the serving cell currently configured for the UE, but also by a neighboring eNB within the same network, or even by an eNB broadcasting a different PLMN (Public Land Mobile Network).

In case a UE wants to receive MBMS from a non-serving cell, the UE must perform a procedure on the non-serving cell that is similar to the procedure required for receiving MBMS from the (primary) serving cell. In order to receive MBMS on a serving or non-serving cell, the MBMS UE must obtain SIB1 (System Information Block 1) to find the scheduling information for SIB13 (System Information Block 13), which carries system information relevant for MBMS reception. If the MBMS service has not started yet, the UE will typically monitor the MBMS specific change notification for the MCCH (Multicast Control Channel).

In multi-frequency deployments, a specific MBMS will typically only be provided on one frequency, also referred to as an MBMS frequency. The network typically applies load balancing between the available neighbor cells provided on different frequencies. Thus, the network may decide to move a UE that is (interested in) receiving an MBMS service to a frequency where the MBMS service of interest is not provided. In order to support service continuity, the network will use the MBMS status report to select an appropriate serving cell for the UE. If the UE is already receiving an MBMS service on its service cell, it may send a MBMS status report to the network, which will try to keep the UE on the same frequency as the serving cell. If the UE's serving cell does not provide the UE's MBMS service of interest, it may send the MBMS status report to the network to inform the network on which frequency it is interested to receive an MBMS. The network will typically configure an appropriate cell operated on that frequency as the UE's new serving cell.

Carrier aggregation (CA) refers to a concept of using multiple carriers on which the UE can transmit and/or receive simultaneously such that higher data rates can be provided to the terminal. In Rel-10, each so-called component carrier can be up to 20 MHz wide. Carrier aggregation (CA) functionality was introduced in 3GPP Rel-10 in order to allow for increased data rates by aggregating contiguous or non-contiguous carriers on the same or different frequency bands for simultaneous transmission from/to the UE. Thus, higher data rates can be provided to the UEs, or even more important, operators do not need to possess contiguous spectrum of 20 MHz to reach the advertised LTE (Long Term Evolution) data rates, but carrier aggregation allows for simultaneous use of distributed spectrum pieces. In the carrier aggregation context, the serving eNB informs the UE which serving cells it shall aggregate such that it can tune its radio front-end to the carrier frequencies used by the serving cells.

In order to be able to configure carrier aggregation or serving cells according to the UE capabilities, 3GPP has defined the SupportedBandCombination Information Element (IE) to inform the network which combination of carriers on which frequency bands the UE supports for carrier aggregation.

The SupportedBandCombination IE is, e.g., defined in TS 36.306 V10.2.0, entitled E-UTRA, User Equipment (UE) radio access capabilities (Release 10), in Section 4.3.5.2. According to this section, the SupportedBandCombination field defines the carrier aggregation and MIMO capabilities supported by the UE for configurations with inter-band, intra-band non-contiguous, intra-band contiguous carrier aggregation and without carrier aggregation. For each band in a band combination the UE provides for uplink and downlink the supported CA bandwidth classes and the corresponding MIMO capabilities. A MIMO capability applies to all carriers of a band in a band combination. In all non-CA band combinations the UE shall indicate a bandwidth class supporting the maximum channel bandwidth defined for the band.

The serving eNB can derive from the SupportedBandCombination IE, on which cells in parallel the UE can support transmission and reception. The cells selected as serving cells for the UE must not exceed the aggregated bandwidth corresponding to the CA bandwidth class provided for each listed frequency band of a band combination. Configuring serving cells for carrier aggregation means in this context that the serving eNB informs the UE via control signaling which serving cells it shall use. According to 3GPP Rel-10, a carrier aggregation capable UE can be configured with up to 5 serving cells. The eNB also has to select the PCell (Primary serving Cell) and inform the UE about this selection. Thus, the remaining serving cells are automatically SCells (secondary serving cells). The UE is only required to read system information from the PCell, while it does not have to read system information from a SCell. Relevant system information is typically provided to the UE via dedicated signaling in an already configured serving cell.

In 3GPP Rel-10, a minimum requirement for CA and MBMS capable UEs is to be able to receive MBMS on the PCell (Primary serving Cell), while MBMS reception on other cells than the PCell is up to UE implementation. According to Rel-10 specification, neither the MBMS reception status nor the MBMS reception capabilities are known to the network. In this context, MBMS reception capabilities are twofold. First, they comprise the UE capability on which carriers of a frequency band a UE can receive at least on MBMS service. Second, they comprise the UE capability whether it can only receive MBMS on a PCell, on any serving cell, or on a non-serving cell.

Up to Rel-10, MBMS UEs cannot report their MBMS reception status to the network such that mobility procedures cannot provide MBMS service continuity. Up to Rel-10, also the MBMS capabilities can not be reported.

Even if a UE informs the network that it is (interested in) receiving MBMS (including the information on which carrier it intends to receive MBMS), the network still does not know whether or not the UE is capable of receiving unicast traffic on other carriers. If the UE is capable to receive unicast traffic on other carriers, the network does not know on which ones.

In order to allow for MBMS reception, the network—according to Rel-10—has to configure the PCell on the carrier on which the UE is interested to receive MBMS. If the UE indicates interest in multiple MBMS carriers, the network does not make any assumptions.

A Rel-10 network does also not know at which data rate it could schedule unicast transmission while the UE is receiving an MBMS service without exceeding the UEs processing and MIMO (Multiple In Multiple Out) capabilities.

If an MBMS and CA capable UE does not provide its MBMS reception status at all, the network can not take into account the MBMS reception of the UE for configuring the serving cell(s). If parallel MBMS and unicast reception is ongoing on more carriers than the UE supports, the UE may drop MBMS or unicast packets depending on its prioritization, resulting in degraded MBMS or unicast performance. Even though lost unicast packets may be retransmitted, retransmission will reduce the unicast data rates and degrade user perception on unicast communication.

Figures 4, 5:
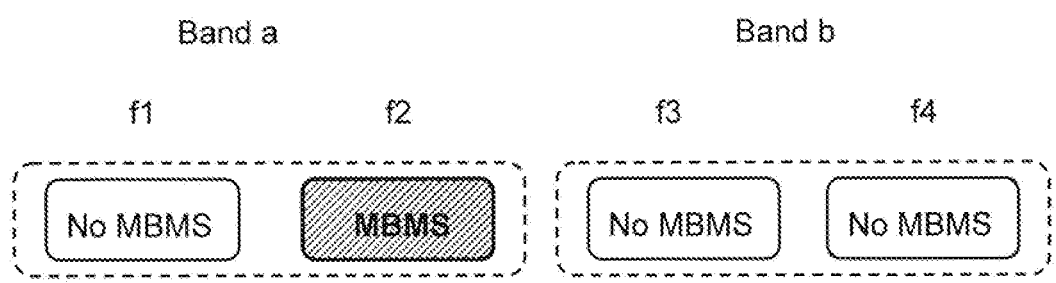
FIG. 4 depicts examples of supported band combinations.
FIG. 5 shows an example of a spectrum divided into carriers and bands, wherein MBMS is provided on one carrier.

FIG. 4 depicts a simplified example of a SupportedBandCombination IE as defined in Rel-10. Each row corresponds with one band combination. The IE in Rel-10 indicates that the UE is capable of intra-band contiguous carrier aggregation of up to two carriers with up to 200 resource blocks (class C) in band a (row 1) or band b (row 2). Furthermore, the UE is capable of inter-band carrier aggregation with one carrier per band with up to 100 resource blocks each (class A).

According to concepts as described herein, a UE supports MBMS reception on any carrier that could also be configured as a (secondary) serving cell according to a SupportedBandCombination IE which the UE provides to the network as part of the UE capability signaling. The LTE SupportedBandCombination IE is defined in 3GPP TS 36.331, Rel-10 and in 3GPP TS 36.306, Rel-10.

One aspect of these concepts is that a network derives from the SupportedBandCombination IE the MBMS reception capabilities of the UE and determines which bearers it may configure as serving cells (Primary Serving Cells (PCell) or Secondary Serving Cells (SCell)) while still enabling the UE to receive an MBMS service.

A preferred aspect of these concepts is that, the UE also provides the network with information about the MBMS service(s) or carrier(s) it is interested in.

With the additional information about the MBMS service(s) or carrier(s) the UE is interested in, the eNB may determines which cells it can configure as serving cells while still enabling the UE to receive the MBMS service(s) it is interested in.

In another embodiment, the UE indicates explicitly, e.g., by means of an additional information element, whether it supports MBMS reception on any carrier that could also be configured as a (secondary) serving cell according to the SupportedBandCombination IE. Only if it does, the procedures as outlined in the first paragraph are applied.

Note that reusing the SupportedBandCombination IE requires aligning the band combinations supported for carrier aggregation and for MBMS. In other words, a UE that offers unicast and MBMS reception on a certain band combination must also support carrier aggregation in that combination. However, this seems to be an acceptable restriction.

In general the disclosure relates to methods in a mobile communication system comprising a network node such as a base station (e.g., an eNB or an RNC) and a UE.

According to one embodiment a method in a network node (e.g., an eNB or an RNC) is provided. The method may comprise steps as already indicated above.

The method in a network node may comprise the receiving an indication (such as a flag) from a User Equipment (such as a terminal) whether the User Equipment supports MBMS reception on at least one SCell and/or on at least one non-serving cell.

The method in a network node may further comprise the receiving an information element (e.g., a SupportedBandCombination IE) comprising information of a band combination supported by the UE for carrier aggregation.

The method in a network node may further comprise configuring at least one carrier as serving cell based on the received indication and the received information element.

Within the method in a network node, the configuration of at least one carrier may further be based on an indication whether the UE is interested in receiving MBMS.

According to one embodiment a method in a UE is provided. The method may comprise the steps as already indicated above.

The method in a UE may comprise transmitting an indication (such as a flag) to a network node whether the UE supports MBMS reception on at least one SCell and/or on at least one non-serving cell. The method in a UE may further comprise transmitting whether the UE is interested in receiving MBMS.

According to one aspect of the disclosure, a base station is provided, which is adapted to perform the above method in a base station. According to one aspect of the disclosure a UE is provided, which is adapted to perform the above method in a UE.

FIG. 5 shows an example scenario, in which two frequency bands a and b are considered. The frequency band a comprises a carrier f1 and a carrier f2, the frequency band b comprises a carrier f3 and a carrier f4. MBMS is provided on carrier f2 only, i.e., MBMS is not provided on carrier f1, f3 and f4.

With respect to this multi-frequency scenario (with carriers f1, f2, f3 and f4, where MBMS is provided on carrier f2 in band a) the following examples describe how the SupportedBandCombination IE with the additional flag indicating whether the UE is capable of receiving MBMS on other cells than the PCell can be used to assist the network to make suitable (primary/secondary) serving cell configurations. As described above, the flag can be explicit or implicit.

In these examples, an MBMS and CA capable UE with the supported band combinations summarized in FIG. 1 is considered.

Furthermore, it is assumed, that this UE indicates support for receiving MBMS on cells/carriers other than the PCell and that it informs the network about its intention to receive MBMS on a certain carrier. With this information at hand the eNB can determine whether the currently configured serving cell(s) allow the UE to receive MBMS as intended and if not, which reconfiguration could be performed. Several examples/cases for such a UE are described in the following.

Case 1: If the UE has its PCell on f2, no SCells configured and it indicates interest in the MBMS service offered on this carrier, the eNB knows that the UE will be able to receive MBMS. Since no unicast data is scheduled to this UE in MBSFN subframes, no special care needs to be taken of the UE's processing capabilities. This applies already for Rel-10 UEs.

Case 2: We assume that the UE has its PCell on f1, f3 or f4 and no SCells configured. If the UE indicates interest in an MBMS service on f2, the network may trigger a PCell handover to f2 to ensure that the UE can receive the MBMS service as intended. However, the information provided by the UE in combination with the fact that no SCells are configured, allows the network to maintain the currently configured PCell and be sure that the UE's RF capabilities still allow for receiving MBMS on f2. If the UE has its PCell on f1, this can be derived from the intra-band aggregation capability signaled in row 1 (see FIG. 1). If the UE has its PCell on f3 or f4 it is concluded from the inter-band aggregation support signaled in row 3 that the UE can receive MBMS on f2, which is a non-serving cell.

Case 3: If the UE is configured for intra-band carrier aggregation on band a (carriers f1+f2), the UE is also capable of receiving MBMS on f2 no matter whether this is the PCell or the SCell.

Case 4: If the UE is configured for intra-band carrier aggregation on band b (carriers f3+f4), see row 2 (FIG. 1), the network knows that the UE is not able to receive MBMS on f2. As soon as the UE indicates interest in receiving MBMS on carrier f2, the network should therefore at least release one of the serving cells on band b. It may optionally configure a serving cell on f2 in combination with either f3 or f4, see row 3, or it could setup carrier aggregation of f1 and f2, see row 1.

If the network is not forced to configure the MBMS carrier/cell as the PCell to ensure service continuity for the UE, the network has the major advantage that it can flexibly select the PCell in carrier aggregation scenarios based on both the channel quality on the carriers and the band combination capabilities indicated by the UE. Thus, the network may maximize or maintain transmission and reception performance for unicast while MBMS reception is ongoing.

Figure 6:
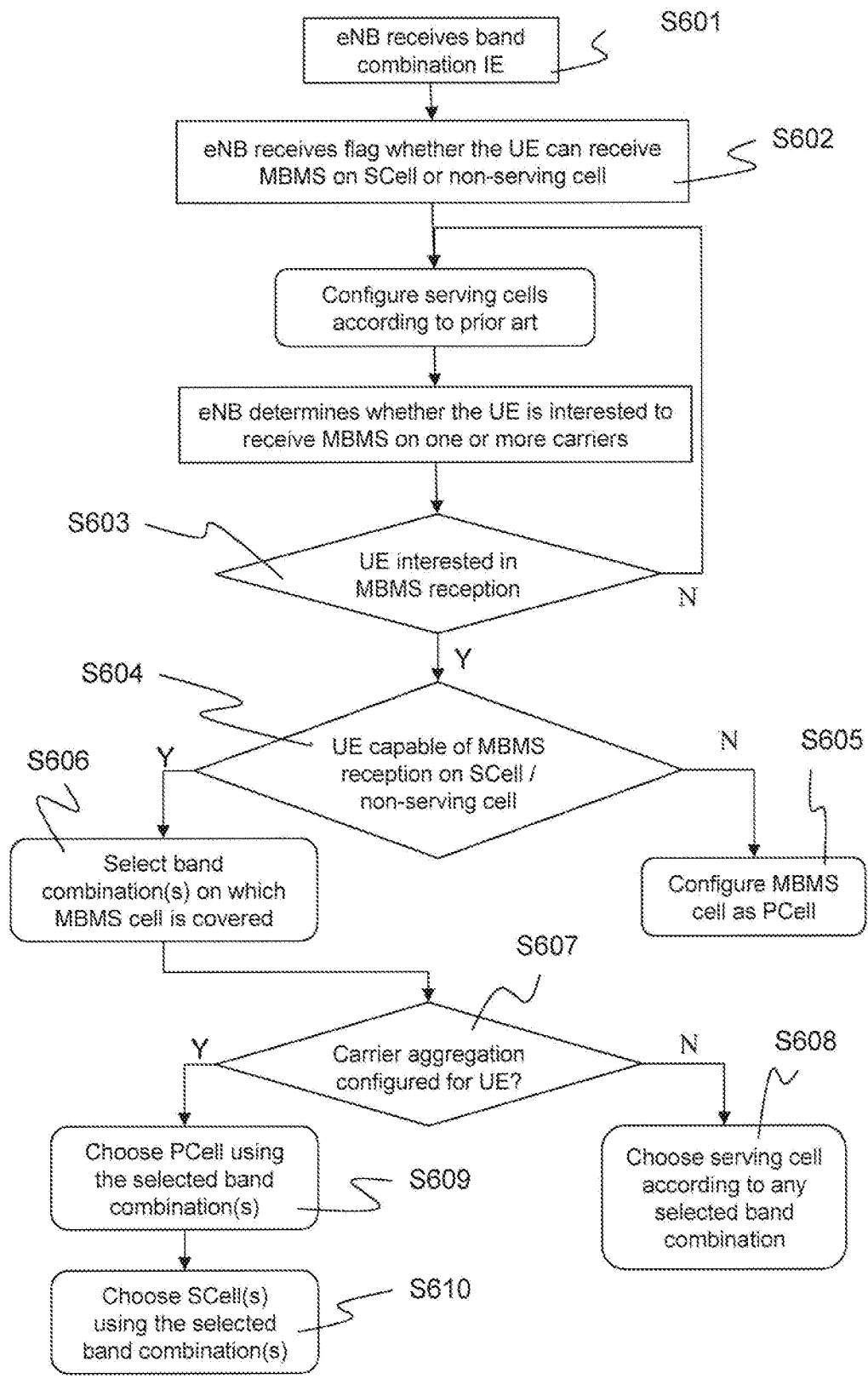
FIG. 6 schematically illustrates a flowchart of a method in a wireless network according to one embodiment.

FIG. 6 schematically illustrates a flowchart of a method in a wireless network according to one embodiment. In a step S601, an eNodeB receives a band combination information element. In a step S602, the eNodeB receives a flag whether the UE can receive MBMS on a secondary cell or non-serving cell. The flag can be implicit or explicit. If 'yes,' a serving cell is configured according to concepts as, e.g., described in 3GPP Rel-10. If 'no', it is checked in a step S603, whether the UE is interested in MBMS reception. If 'yes', it is checked, in a step S604, whether the UE is capable of receiving MBMS on a secondary or non-serving cell.

If 'no', the MBMS cell is configured as primary serving cell, step S605. If yes', in a step S606, at least one band combination is selected on which the MBMS cell is covered. Depending on the eNB strategy, the UE will choose an appropriate band combination among the selected band combinations, e.g., based on the signal qualities for the UE or the load on these carriers.

In a step S607, it is checked whether carrier aggregation is configured for the UE. If 'no,' in a step S608, a serving cell is selected according to any band combination. The eNB may select a specific band combination at a later point of time when the UE is configured for carrier aggregation and the eNB configures more serving cells for the UE according to step S609.

If 'yes' the primary serving cell is chosen according to the at least one selected band combination, step S609. In a step S610, at least one secondary serving cell is chosen according to the at least one selected band combination.

In this way, continuity of an MBMS service is achieved, while offering flexibility in selecting serving cells according to certain measures, such as quality of MBMS or unicast service.

Figure 7:
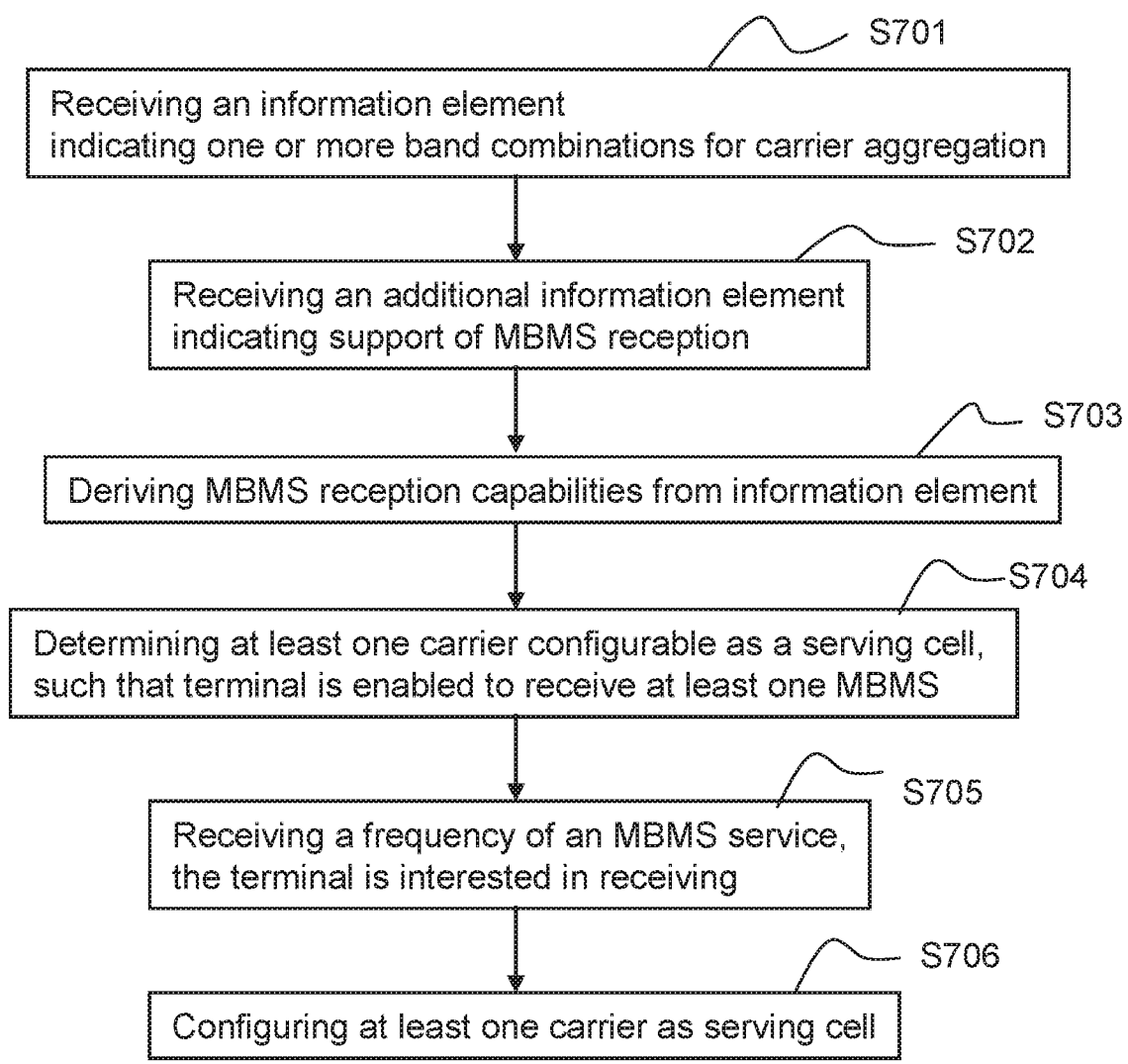
FIG. 7 schematically illustrates a flowchart of a method in a base station according to one embodiment.

FIG. 7 schematically illustrates a flowchart of a method for supporting continuity of a Multimedia Broadcast Multicast Service, MBMS, for a terminal. To implement the method, one or more of the steps illustrated in FIG. 7 may be performed by a network e.g., a radio access network such as an E-UTRAN. In particular, the one or more of the steps illustrated in FIG. 7 may be performed in a base station such as an eNodeB of a mobile communication network.

In a step S701, the base station receives, from the terminal, an information element informing the base station of a combination of bands, which the terminal supports for carrier aggregation.

The information element may be the SupportedBandCombination Information Element as e.g., defined in the Rel-10 LTE standards. The information element may comprise a combination of frequency bands, wherein each band is associated with a bandwidth class supported for carrier aggregation. The term informing the base station may comprises that the information element actually comprises the particular information or that the base station determines the particular information from that information element possibly in combination with other resources of information available at the base station.

From the received information element, the base station can derive carriers that can be configured as a serving cell for the terminal. The serving cell can e.g., be a primary serving cell and/or at least one secondary serving cell. The terminal supports MBMS reception on any carrier configurable as a serving cell for the terminal according to the information element. In this way the information on which carrier the terminal is capable to receive MBMS can implicitly be signaled to the base station.

In a step S703, the base station derives, from the received information element, MBMS reception capabilities of the terminal. The capabilities comprise the carriers on which the terminal can receive MBMS. The capabilities may further comprise whether the MBMS carrier must be configured as PCell, SCell or any non-serving cell covered by at least one of the supported band combinations.

In a step S704, the base station determines a number of carriers, which the base station can configure as a serving cell of the terminal, such that the terminal is enabled to receive at least one MBMS. The determination is based on the derived MBMS capabilities. The serving cell can be a primary serving cell or at least one secondary serving cell.

The base station may configure at least one carrier as serving cell of the terminal on the basis of the determined number of carriers. The base station can configure the at least one carrier as serving cell of the terminal, such that the terminal is enabled to receive the at least one MBMS from a non-serving cell of from a serving cell.

For a terminal in connected mode, a serving cell is a cell on which the terminal can send and receive unicast data, i.e., where a radio bearer is established. A non-serving cell broadcasts all information that is needed for a terminal to connect to it. No radio bearers are established in a non-serving cell.

In an optional further step S705, the base station obtains, from the terminal, an indication of at least one MBMS and/or at least one carrier of an MBMS, in which the terminal is interested. For example, the terminal sends a frequency of a MBMS service to the base station, to indicate that the terminal is interested in receiving a Multimedia Broadcast Multicast Service (MBMS) on this frequency.

In an optional further step S706, the base station configures at least one carrier as serving cell of the terminal on the basis of the determined number of carriers and the received indication, such that the terminal is enabled to receive the at least one MBMS service the terminal is interested in. For example, the base station configures the serving cell on the basis of the at least one determined carrier that is covered by the at least one supported band combination and on the basis of the MBMS service for which the terminal has indicated interest. A terminal is enabled to receive an MBMS service when it can receive the MBMS from either a serving or a non-serving cell.

In an optional step S702, the base station obtains, from the terminal, an explicit indication that the terminal supports MBMS reception on any carrier that is configurable as a serving cell according to the information element. The explicit indication may be given via an additional or a second information element. For example, only if the additional or second information element indicates support of MBMS reception on any carrier configurable as serving cell according to the information element the outlined procedure shall be performed. For example, only if respective MBMS support is indicated by the additional or second information element, the deriving step S703, the determining step S704 and possibly further steps such as steps S705 and/or S706 are performed.

Figure 8:
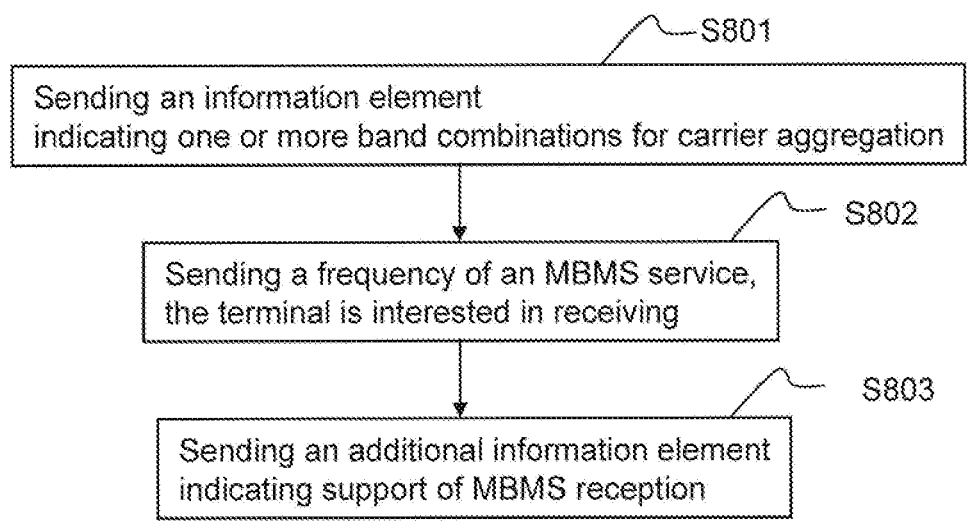
FIG. 8 schematically illustrates a flowchart of a method in a terminal according to one embodiment.

FIG. 8 schematically illustrates a flowchart of a method in a terminal for supporting continuity of a MBMS service for the terminal. Concepts of the invention are described from a base station perspective with respect to FIG. 7, whereas similar concepts are described from a terminal perspective with respect to FIG. 8. Continuity of a MBMS service comprises that the continuity of a MBMS service is supported when a service cell is configured on a particular frequency. In particular, MBMS reception can be ensured on this serving cell or on a non-serving cell where the serving and non-serving cells are covered by a supported band combination.

In a step S801, the terminal sends to a base station, an information element informing the base station of a combination of bands, which the terminal supports for carrier aggregation. From the information element carrier can be derived by a base station, which can be configured as a serving cell. The terminal supports MBMS reception on any carrier configurable as a serving cell for the terminal according to the information element. In this way the information on which carriers the terminal is capable to receive MBMS can implicitly be signaled to the base station. The information element may be the SupportedBandCombination Information Element as e.g., defined in the Rel-10 LTE standards. The information element is further discussed with respect to FIG. 7.

In an optional step S802, the terminal indicating to the base station at least one MBMS and/or at least one carrier of an MBMS, in which the terminal is interested. The terminal may receive the at least one MBMS from a non-serving cell or from a serving cell.

In an optional step S803, the terminal indicates explicitly to the base station that the terminal supports MBMS reception on any carrier that is configurable as a serving cell according to the information element. The explicit indication may be done via an additional or a second information element.

Figure 9:
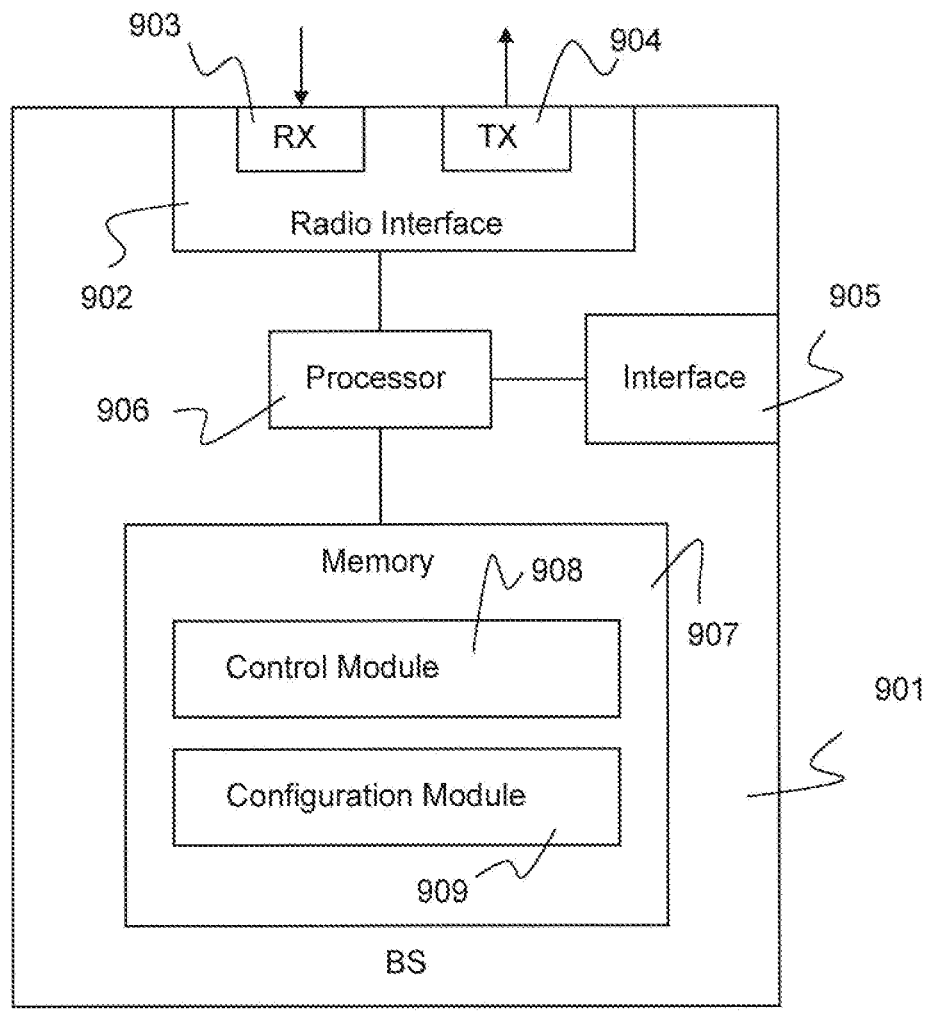
FIG. 9 schematically illustrates a base station according to one embodiment.

FIG. 9 schematically illustrates exemplary structures for implementing the above concepts in a base station 901 according to one embodiment. In the illustrated structure, the base station 901 includes a radio interface 902 for data transmission to or from the terminal 1001. It is to be understood that for implementing transmitter (TX) functionalities the radio interface 902 may include one or more transmitters 904, and that for implementing receiver (RX) functionalities the radio interface 902 may include one or more receivers 903. The receiver 903 may in particular be configured to receive, from the terminal, the above mentioned information element. Further, the base station 901 may include an interface 905 for communicating with other nodes of the network.

Further, the base station 901 includes a processor 906 coupled to the interfaces 902 and 905 and a memory 907 coupled to the processor 906. The memory 907 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 907 includes suitably configured program code to be executed by the processor 906 so as to implement the above-described functionalities of the BS 901. More specifically, the memory 907 may include a control module 908 for accomplishing the above-described concepts such as deriving, from the received information element, MBMS reception capabilities of the terminal, and for determining number of carriers. Further, the memory 907 may include a configuration module 909 for accomplishing the above described concepts such as configuring at least one carrier as serving cell of the terminal.

It is to be understood that the structure as illustrated in FIG. 9 is merely schematic and that the base station 901 may actually include further components which, for the sake of clarity, have not been illustrated, e.g., further interfaces or additional processors. Also, it is to be understood that the memory 907 may include further types of program code modules, which have not been illustrated. For example, the memory 907 may include program code modules for implementing typical functionalities of a base station, e.g., known functionalities of an eNodeB.

According to some embodiments, also a computer program product may be provided for implementing concepts according to embodiments of the invention, e.g., a computer readable medium storing the program code and/or other data to be stored in the memory 907.

Figure 10:
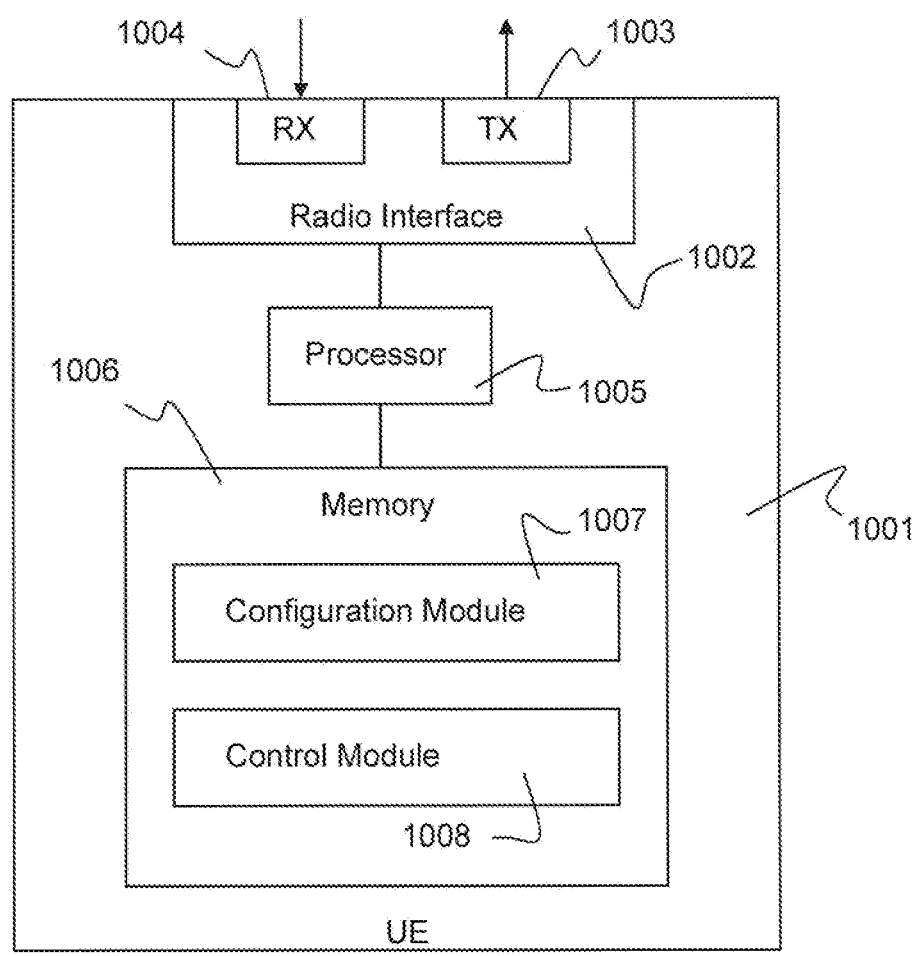
FIG. 10 schematically illustrates a terminal according to one embodiment.

FIG. 10 schematically illustrates exemplary structures for implementing the above-described concepts in a terminal 1001. In the illustrated structure, the terminal 1001 includes a radio interface 1002 for performing data transmission to or from a mobile network, e.g., via the base station 901. In particular, the radio interface 1002 may be configured for sending the above described information element to the base station 901. It is to be understood that for implementing transmitter (TX) functionalities the radio interface 1002 includes one or more transmitters 1003 and that for implementing receiver (RX) functionalities the radio interface 1002 may include one or more receivers 1004.

Further, the terminal 1001 includes a processor 1005 coupled to the radio interface 1002 and a memory 1006 coupled to the processor 1005. The memory 1006 may include a ROM, e.g., a flash ROM, a RAM, e.g., a DRAM or SRAM, a mass storage, e.g., a hard disk or solid state disk, or the like. The memory 1006 includes suitably configured program code to be executed by the processor 1005 so as to implement the above-described functionalities of the terminal 1001. More specifically, the memory 1006 may include a configuration module which e.g., configures the information element such that the terminal supporting MBMS reception for any carrier configurable as a serving cell for the terminal according to the information element. Further, the memory 1006 may include a control module 1008 for performing various control operations.

It is to be understood that the structure as illustrated in FIG. 9 is merely schematic and that the terminal 1001 may actually include further components which, for the sake of clarity, have not been illustrated, e.g., further interfaces or additional processors. Also, it is to be understood that the memory 1006 may include further types of program code modules, which have not been illustrated. For example, the memory 1006 may include program code modules for implementing typical functionalities of a terminal or program code of one or more applications to be executed by the processor 1005.

According to some embodiments, also a computer program product may be provided for implementing concepts according to embodiments of the invention, e.g., a computer-readable medium storing the program code and/or other data to be stored in the memory 1006.

The embodiments as described above support the continuity of MBMS by the concept that the terminal implicitly informs the base station of the MBMS reception capabilities of the terminal and the base station uses this information to determine a number of carriers for configuring a serving cell such that MBMS reception can be enabled. This also offers a further degree of freedom in configuring a serving cell. For example, the serving cell can be configured such that an improved quality of unicast and/or MBMS transmission is obtained, e.g., a reduced number of lost packets in the respective service is obtained. The further degree of freedom can also be used to reduce certain types of interference. Still the continuity of MBMS is supported. The MBMS reception may be performed on one of the configured serving cells or on a non-serving cell.

According to the concepts described above, the network (or base station) can ensure that the UE (or terminal) is able to receive MBMS services as desired while still being able to configure (primary/secondary) serving cells for unicast communication with a large degree of flexibility.

Suitable unicast configuration of serving cells avoids that the UE (or terminal) has to drop MBMS or unicast packets. If the UE (or terminal) supports MBMS reception on other cells than the PCell, the PCell can be optimally selected by the network to maximize the performance for unicast.

The use of an additional information element indicating whether or not the UE (or terminal) supports MBMS reception on any carrier that could also be configured as a (secondary) serving cell according to the SupportedBandCombination IE allows to introduce the feature in a backwards compatible way. That means, only for UEs (or terminals) supporting this feature the network derives the MBMS reception capabilities from the SupportedBandCombination IE.

It is to be understood that the examples and embodiments as explained above are merely illustrative and susceptible to various modifications. For example, the concepts could be used in types of mobile network which differ from the above-mentioned examples of an LTE mobile network. Further, it is to be understood that the above concepts may be implemented by using correspondingly designed software in existing mobile network nodes or UEs, or by using dedicated hardware of such mobile network nodes or UEs.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method implemented in a base station of a mobile communication network for supporting a Multimedia Broadcast Multicast Service, MBMS, for a terminal, the method comprising:
   receiving, at the base station from the terminal, an indication of a combination of bands that the terminal supports for carrier aggregation;
   deriving, based on the indication, MBMS reception capabilities of the terminal; and
   configuring, based on the derived MBMS reception capabilities of the terminal, at least one carrier for the terminal, such that the terminal is enabled to receive at least one MBMS.

2. The method of claim 1 wherein deriving, from the received indication, MBMS reception capabilities of the terminal comprises determining that the terminal supports MBMS reception on any carrier configurable as a serving cell for the terminal.

3. The method of claim 2 wherein deriving, from the received indication, MBMS reception capabilities of the terminal comprises determining the terminal supports MBMS reception on any carrier configurable as a secondary serving cell for the terminal.

4. The method of claim 1 further comprising obtaining, from the terminal, an indication of at least one of an MBMS and a carrier of an MBMS, in which the terminal is interested.

5. The method of claim 4 wherein configuring at least one carrier for the terminal is further based on the indication from the terminal of at least one MBMS and a carrier of an MBMS.

6. The method of claim 1 wherein configuring at least one carrier for the terminal comprises configuring a carrier such that the terminal is enabled to receive the at least one MBMS from a non-serving cell.

7. The method of claim 1 wherein configuring at least one carrier for the terminal comprises configuring a carrier such that the terminal is enabled to receive the at least one MBMS from a serving cell.

8. The method of claim 1 wherein the indication is a Long Term Evolution, LTE, SupportedBandCombination IE.

9. The method of claim 1 further comprising obtaining, from the terminal, an explicit indication that the terminal supports MBMS reception on any carrier that is configurable as a serving cell according to the indication.

10. A method implemented in a terminal for supporting a Multimedia Broadcast Multicast Service, MBMS, for the terminal, the method comprising:
    configuring, by the terminal, an indication from which a base station is enabled to derive MBMS reception capabilities of the terminal;
    sending the indication to the base station to inform the base station of a combination of bands that are supported by the terminal for carrier aggregation, wherein the terminal supports MBMS reception for any carrier configurable as a serving cell for the terminal according to the combination of bands in the indication; and receiving at least one MBMS on a carrier configured by the base station based on the MBMS reception capabilities of the terminal.

11. The method of claim 10 further comprising indicating to the base station at least one of an MBMS and a carrier of an MBMS, in which the terminal is interested.

12. The method of claim 10 further comprising receiving the at least one MBMS from a non-serving cell.

13. The method of claim 10 further comprising receiving the at least one MBMS from a serving cell.

14. The method of claim 10 wherein the indication is a Long Term Evolution, LTE, SupportedBandCombination IE.

15. The method of claim 11 further comprising indicating to the base station that the terminal supports MBMS reception on any carrier that is configurable as a serving cell according to the indication.

16. The method of claim 10 further comprising indicating to the base station that the terminal supports MBMS reception on any carrier configurable as a secondary serving cell for the terminal.

17. A base station for a mobile communication network and for supporting a Multimedia Broadcast Multicast Service, MBMS, for a terminal, the base station comprising:
 a receiver configured to receive, from the terminal, an indication of a combination of bands that the terminal supports for carrier aggregation;
 a processing circuit configured to:
  derive, from the received indication, MBMS reception capabilities of the terminal; and
  configure, based on the derived MBMS reception capabilities of the terminal, at least one carrier for the terminal, such that the terminal is enabled to receive at least one MBMS.

18. The base station of claim 17 wherein the terminal supports MBMS reception on any carrier configurable as a serving cell for the terminal.

19. The base station of claim 18 wherein the terminal supports MBMS reception on any carrier configurable as a secondary serving cell for the terminal.

20. The base station of claim 17 wherein the processing circuit is further configured to obtain, from the terminal, an indication of at least one of an MBMS and a carrier of an MBMS, in which the terminal is interested.

21. The base station of claim 20 wherein configuring, by the processing circuit, at least one carrier for the terminal is further based on the indication from the terminal of at least one of the MBMS and the carrier of the MBMS.

22. The base station of claim 17 wherein configuring, by the processing circuit, at least one carrier for the terminal comprises configuring a carrier, such that the terminal is enabled to receive the at least one MBMS from a non-serving cell.

23. The base station of claim 17 wherein configuring, by the processing circuit, at least one carrier for the terminal comprises configuring a carrier, such that the terminal is enabled to receive the at least one MBMS from a serving cell.

24. The base station of claim 17 wherein the processing circuit is further configured to obtain, from the terminal, an indication that the terminal supports MBMS reception on any carrier that is configurable as a serving cell according to the indication.

25. A terminal for a wireless communication network and for supporting a Multimedia Broadcast Multicast Service, MBMS, for the terminal, the terminal comprising:
 a processing circuit configured to configure an indication from which a base station is enabled to derive MBMS reception capabilities of the terminal;
 a transmitter configured to send the indication to the base station to inform the base station of a combination of bands that are supported by the terminal for carrier aggregation, wherein the terminal supports MBMS reception for any carrier configurable as a serving cell for the terminal according to the combination of bands in the indication; and
 a receiver configured to receive at least one MBMS on a carrier configured by the base station based on the MBNMS reception capabilities of the terminal.

26. The terminal of claim 25 wherein the processing circuit is further configured to indicate to the base station at least one of an MBMS and a carrier of an MBMS, in which the terminal is interested.

27. The terminal of claim 25 further comprising a receiver configured to receive the at least one MBMS from a non-serving cell.

28. The terminal of claim 25 further comprising a receiver configured to receive the at least one MBMS from a serving cell.

29. The terminal of claim 25 wherein the processing circuit is further configured to indicate to the base station that the terminal supports MBMS reception on any carrier that is configurable as a serving cell according to the indication.

30. The terminal of claim 25 wherein the processing circuit is further configured to indicate to the base station that the terminal supports MBMS reception on any carrier configurable as a secondary serving cell for the terminal.

* * * * *

UNITED STATES PATENT AND TRADEMARK OFFICE
CERTIFICATE OF CORRECTION

| | |
|---|---|
| PATENT NO. | : 10,939,412 B2 |
| APPLICATION NO. | : 16/657299 |
| DATED | : March 2, 2021 |
| INVENTOR(S) | : Phan et al. |

It is certified that error appears in the above-identified patent and that said Letters Patent is hereby corrected as shown below:

In the Specification

Column 1, Line 9, delete "2018," and insert -- 2018, now U.S. Pat. No. 10,455,548, --, therefor.

Column 3, Line 65, delete "WMax," and insert -- WiMax, --, therefor.

Column 4, Lines 2-3, delete "equipment (UEs)" and insert -- equipments (UEs) --, therefor.

Column 6, Line 56, delete "at least on" and insert -- at least one --, therefor.

Column 9, Line 53, delete "yes'," and insert -- 'yes', --, therefor.

Column 10, Line 57, delete "of from" and insert -- or from --, therefor.

In the Claims

Column 16, Line 29, in Claim 25, delete "MBNMS" and insert -- MBMS --, therefor.

Signed and Sealed this
Tenth Day of May, 2022

Katherine Kelly Vidal
*Director of the United States Patent and Trademark Office*